No. 793,181. PATENTED JUNE 27, 1905.
J. P. CRANE.
COMPOSITION OF MATTER.
APPLICATION FILED JULY 29, 1904.
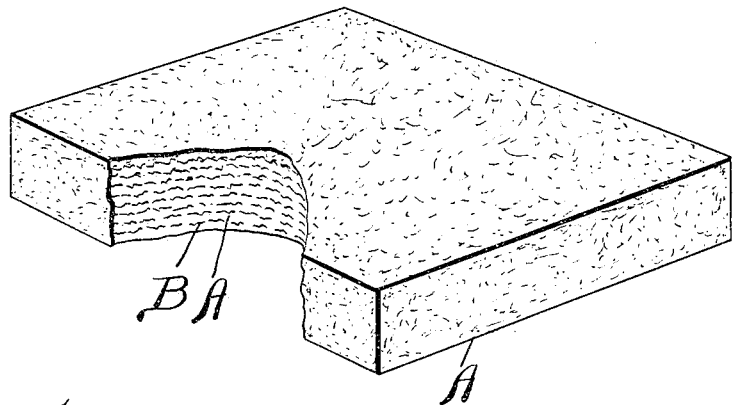
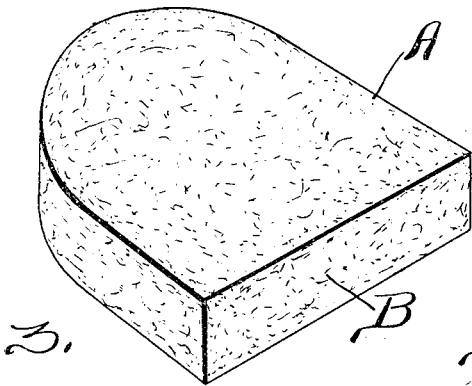
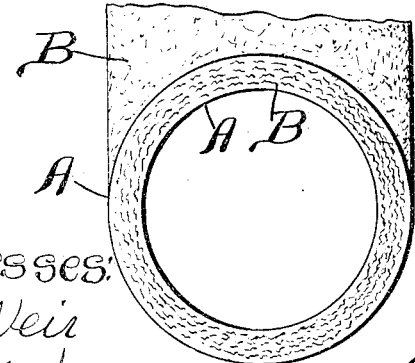
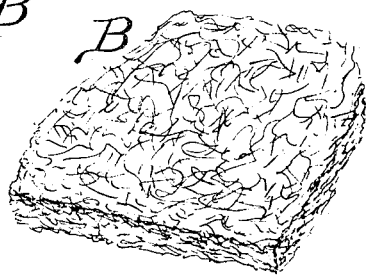
Witnesses:
J. B. Weir
Emil E. Nattmann
Inventor:
James P. Crane
By Elliott & Hopkins
Attorneys No. 793,181. Patented June 27, 1905.

UNITED STATES PATENT OFFICE.

JAMES P. CRANE, OF CHICAGO, ILLINOIS.

COMPOSITION OF MATTER.

SPECIFICATION forming part of Letters Patent No. 793,181, dated June 27, 1905.

Application filed July 29, 1904. Serial No. 218,617.

*To all whom it may concern:*

Be it known that I, JAMES P. CRANE, a citizen of the United States, residing in the city of Chicago, county of Cook, and State of Illinois, have invented certain new and useful Improvements in the Composition of Matter, of which the following is a full, clear, and exact specification.

My invention relates to improvements in compositions of matter in which rubber, vulcanizable gums, and other similar substance form a basis having combined therewith fine metallic elongated fibers.

The prime object of my invention is to produce a composition of matter which shall have all of the characteristics of rubber in elasticity, pliability, and resistance to slipping on frozen substances—such, for example, as ice and snow—of vulcanized rubber with the added features of a substantially greater resistance to wear, resistance to slipping upon wet surfaces, and non-puncturability from sharp points of various substances, and particularly cutting and puncturing by glass, whereby a composition of matter is produced which is particularly adapted for use for rubber heels, bicycle and other vehicle tires, and for any purpose where it may be subjected to wear, both specifically and common to both of said devices.

A further object is to produce a composition of matter containing and embracing the foregoing characteristics and which at the same time may be molded into various forms and articles which shall possess these characteristics uniformly throughout the mass so formed, whereby the uniformity of wear and non-puncturability, &c., is correspondingly promoted and extended.

A further object of my invention is to produce a composition of matter which, however manipulated in its production, shall invariably be more in appearance rubber than the material combined therewith, the degree of toughness, pliability, and softness of which shall be entirely due to the rubber and not to the materials incorporated therewith and the uses for which it is intended involving thickness as distinguished from thin sheets, which latter for additional thickness require the employment of linings and facings superimposed thereon.

With these ends in view my invention consists in certain materials and combination of materials and also in about the proportions hereinafter specified, described, and set forth in the claims and illustrated in the accompanying drawings, in which—

Figure 1 illustrates the employment of my composition of matter molded or otherwise formed in block form for any purposes and in such form as may be adapted. Fig. 2 represents the embodiment of my composition of matter in the form of a heel for shoes. Fig. 3 is the embodiment of my composition of matter in the form of a tire for bicycles, automobiles, or other vehicles; and Fig. 4, a perspective view of a layer of steel wool.

Similar letters of reference indicate the same parts in the several figures of the drawings.

A indicates a vulcanized gum, preferably vulcanized rubber, but may be other material that is both elastic and pliable.

B is a metal elongated fiber, preferably steel wool.

The several forms illustrated in Figs. 1, 2, and 3 not only serve to indicate the character of my composition of matter, but some various forms and uses to which it may be applied, and in this connection it may also be observed that it may be employed to advantage in the soles of rubber shoes of various kinds, for cushions used on the ends of chair-legs and furniture of various kinds, and, in fact, for any use making it desirable to utilize the elasticity and pliability of rubber and also the flexibility when at the same time it is desirable to have such cushion resist a tendency to slip, to be injured by puncturing, cutting by glass or other sharp instruments, thereby promoting its function, durability, and form.

In carrying out my invention any vulcanizable gum, but preferably vulcanizable rubber, before being vulcanized is placed in a mold of any desired form and an elongated metal fiber, preferably steel wool, is then so arranged and immersed therein that its fibers shall be uniformly distributed throughout the gum, but in such proportions relative to the amount or bulk of rubber employed that the wool shall not substantially reduce or modify the elasticity, flexibility, or pliability of the rubber after it is subsequently vulcanized, and so that, in fact, the article produced shall be a mass of rubber having the metallic fibers combined with and distributed therethrough and not a mass wherein the metallic fiber is the base or to which is due the elasticity, flexibility, or pliability of the article produced. On the other hand, metallic wool may first be placed in a mold and the rubber solution poured thereon until the mold is filled and the fibers of the wool uniformly distributed through the mass. Again, the fiber may be so arranged in the rubber that it will be in layers embedded in the rubber, as indicated in Figs. 1 and 3, an arrangement particularly desirable in vehicle-tires to prevent puncturing and cutting.

When the proper proportions of rubber and wool are maintained, as above indicated, the mass, after being vulcanized, will have all of the characteristics of rubber, but with the additional feature of having a fine metallic fiber throughout, constantly presenting upon the wearing-surface of the mass fine metallic projections not only serving to promote the wear of that surface and prevent its slipping upon frozen surfaces, but to an equal degree preventing its slipping upon wet surfaces, which the rubber alone easily slips upon, while at the same time there is no substantial or objectionable reduction in either the elasticity, flexibility, or pliability and cushioning effect of the product for the purpose of heels, vehicle-tires, cushions for chairs, doormats, &c., and for the latter in particular, wherein flexibility combined with the abrading surface is obviously desirable.

Although the commercial article known as "steel wool" is at present the only commercial commodity that is feasible for carrying out my invention, I nevertheless do not desire it to be understood that my invention is limited to this specific material, inasmuch as any metallic elongated fiber will answer the purpose so long as it possesses the qualities of tensile strength and elasticity and is of a crumpled character or form like the fibers of steel wool, for it is readily seen that while an elongated steel fiber or other metallic fiber might possess the character of flexibility and be capable of bending transversely of its longitudinal axis it would not permit the rubber body to stretch lengthwise of such axis and if used, therefore, would defeat the object of my invention, whereas the crumpled form of the steel wool permits the rubber to stretch, expand, or compress in any direction, and these fibers being intimately knitted together or interlocked produce in themselves a cushion-like mass, and therefore instead of detracting from the flexibility and elasticity of the rubber rather enhance these properties, while at the same time their tensile strength greatly augments its tenacious property, which is essential to the compound in all of the uses for which it is designed.

Having described my invention, what I claim, and desire to secure by Letters Patent, is—

1. A new composition of matter consisting of elastic vulcanized rubber as a base and elongated crumpled and interlocked metallic fibers incorporated therewith throughout the mass.

2. A new composition of matter consisting of a mass composed of vulcanized rubber in an elastic and flexible condition substantially throughout which is distributed metallic wool in proportions by which elasticity and pliability of the mass is due to the rubber, and at the same time producing a resisting wearing-surface therefor, substantially as described.

3. A new composition of matter consisting of vulcanized rubber, having steel wool uniformly distributed therethrough in such proportions as to produce a resisting wearing-surface for a mass of rubber the elasticity and pliability of which mass is due to the rubber, substantially as described.

JAMES P. CRANE.

Witnesses:
 JNO. G. ELLIOTT,
 M. B. ALLSTADT.